United States Patent
Hitzinger

(10) Patent No.: US 11,285,988 B1
(45) Date of Patent: Mar. 29, 2022

(54) PASSENGER VEHICLE AND RETRACTABLE DRIVER INPUT DEVICES THEREOF

(71) Applicant: Alexander Hitzinger, Mountain View, CA (US)

(72) Inventor: Alexander Hitzinger, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 338 days.

(21) Appl. No.: 16/278,421

(22) Filed: Feb. 18, 2019

(51) Int. Cl.
  *B62D 1/183* (2006.01)
  *B60K 26/02* (2006.01)
  *G05D 1/00* (2006.01)

(52) U.S. Cl.
  CPC .............. *B62D 1/183* (2013.01); *B60K 26/02* (2013.01); *G05D 1/0061* (2013.01); *G05D 1/0088* (2013.01); *B60K 2026/026* (2013.01); *G05D 2201/0213* (2013.01)

(58) Field of Classification Search
  CPC .. B62D 1/183; B60K 26/02; B60K 2026/026; G05D 1/0061; G05D 1/0088
  See application file for complete search history.

(56) References Cited

U.S. PATENT DOCUMENTS 6,182,525 B1 * 2/2001 Bowers .................. B60K 20/02
  180/274
6,318,208 B1 * 11/2001 Thongs, Jr. .............. G05G 1/38
  74/513

(Continued)

FOREIGN PATENT DOCUMENTS

CA  2610886  * 12/2006  ......... B60R 11/0235
CN  106608278 A  5/2017
(Continued)

OTHER PUBLICATIONS

Jake, Lingeman; "Mercedes-Benz Vision Tokyo Connected Lounge here to whisk Gen Z Away", Oct. 27, 2015; Autoweek.com, Gallery Images and p. 3 (Year: 2015).*
(Continued)

*Primary Examiner* — Peter D Nolan
*Assistant Examiner* — Kenneth M Dunne
(74) *Attorney, Agent, or Firm* — Young Basile Hanlon & MacFarlane, P.C.

(57) ABSTRACT

A passenger vehicle includes a vehicle body, drive and steering systems, and manual and autonomous control systems. The vehicle body defines a passenger compartment. The drive system propels the passenger vehicle. The steering system steers the passenger vehicle. The manual control system includes input devices to receive user inputs is configured to control the drive and steering system according to the user inputs when the passenger vehicle is operated in a manual drive mode. The autonomous control system includes a sensor for sensing an external condition and a controller that autonomously controls the drive and steering systems according to the external condition when the passenger vehicle is operated in an autonomous drive mode. The user input devices are movable between a first configuration to receive the user input by being physically manipulated by the user, and a second configuration in which the user input is not receivable.

29 Claims, 8 Drawing Sheets

(56) References Cited

U.S. PATENT DOCUMENTS

| | | | |
|---|---|---|---|
| 6,349,965 B1* | 2/2002 | Heilig | B60R 21/02 |
| | | | 280/748 |
| 7,793,980 B2 | 9/2010 | Fong | |
| 7,894,951 B2 | 2/2011 | Norris et al. | |
| 8,126,642 B2 | 2/2012 | Trepagnier et al. | |
| 9,073,574 B2 | 7/2015 | Cuddihy et al. | |
| 9,333,983 B2 | 5/2016 | Lathrop et al. | |
| 9,809,155 B2 | 11/2017 | Watz et al. | |
| 9,828,016 B2 | 11/2017 | Lubischer et al. | |
| 9,845,103 B2 | 12/2017 | Lubischer et al. | |
| 9,963,035 B2 | 5/2018 | El Aile et al. | |
| 10,994,611 B1* | 5/2021 | Kim | B60K 26/02 |
| 2004/0016588 A1 | 1/2004 | Vitale et al. | |
| 2006/0284839 A1 | 12/2006 | Breed et al. | |
| 2011/0153160 A1 | 6/2011 | Hesseling et al. | |
| 2013/0002416 A1 | 1/2013 | Gazit | |
| 2014/0277896 A1* | 9/2014 | Lathrop | B62D 1/06 |
| | | | 701/23 |
| 2015/0142246 A1* | 5/2015 | Cuddihy | B60R 21/20 |
| | | | 701/23 |
| 2016/0082867 A1 | 3/2016 | Sugioka et al. | |
| 2016/0375770 A1* | 12/2016 | Ryne | B60K 35/00 |
| | | | 701/23 |
| 2016/0375860 A1* | 12/2016 | Lubischer | B60R 21/203 |
| | | | 74/493 |
| 2017/0225570 A1 | 8/2017 | El Aile et al. | |
| 2017/0297606 A1* | 10/2017 | Kim | B62D 1/181 |
| 2018/0079426 A1* | 3/2018 | Salter | G05D 1/0061 |
| 2018/0079441 A1* | 3/2018 | McKinzie | B62D 1/183 |
| 2018/0154932 A1* | 6/2018 | Rakouth | B62D 1/286 |
| 2018/0244175 A1* | 8/2018 | Tan | B60N 2/22 |
| 2019/0185041 A1* | 6/2019 | Shin | B62D 1/181 |
| 2019/0308662 A1* | 10/2019 | Christiansen | B62D 1/10 |
| 2020/0262321 A1* | 8/2020 | Masu | B60N 2/20 |

FOREIGN PATENT DOCUMENTS

| | | | | | |
|---|---|---|---|---|---|
| DE | 10336344 | A1 | * | 2/2005 | ............... B60T 7/06 |
| DE | 102015220526 | A1 | | 4/2017 | |
| DE | 102016011461 | | * | 4/2017 | ............ B60K 37/04 |
| DE | 102016015254 | A1 | | 5/2017 | |
| DE | 102015225522 | A1 | | 6/2017 | |
| DE | 102018006580 | | * | 2/2019 | ............ B60K 35/00 |
| DE | 102017212686 | | * | 6/2019 | ............... B62D 1/04 |
| DE | 10201821092 | | * | 6/2020 | ............ B60K 35/00 |
| EP | 1488963 | A1 | * | 12/2004 | ............ B60T 7/065 |
| FR | 2861657 | A1 | * | 5/2005 | ............... B62D 1/04 |
| FR | 3033305 | A1 | | 9/2016 | |
| FR | 3064239 | | * | 9/2018 | ............ B62D 1/181 |
| KR | 20170137427 | | * | 12/2017 | ............... G05G 1/30 |
| WO | WO03020571 | | * | 3/2003 | ......... B60R 25/0227 |
| WO | WO2006076959 | | * | 7/2006 | ............ B60K 35/00 |

OTHER PUBLICATIONS

Ed, Tahaney; "Peugeot Instinct Shooting Brake Concept Revealed"; Feb. 27, 2017; automobilemag.com; p. 3 and Gallery Images (Year: 2017).*

Daimler, "Integrated Safety—new ideas for a new mobility", May 2019 (Year: 2019).* brose.com, "Flexible Functions for Autonomous Driving: Brose to present multifunctional interior of the future", Frankfurt AM Main, <https://www.brose.com/cz-en/press/2017/iaa-2017-flexible-functions-for-autonomous-driving-brose-to-present-multifunctional-interior-of-the-future.html>, Sep. 13, 2017, Downloaded Feb. 18, 2019 (3 pp).

pcworld.com, "Riding in the Mercedes-Benz F015 concept car, the self-driving lounge of the future", <https://www.pcworld.com/article/2897627/riding-in-the-mercedes-benz-f-015-concept-car-the-self-driving-lounge-of-the-future.html>, Mar. 23, 2015, Downloaded Feb. 18, 2019 (6 pp).

* cited by examiner

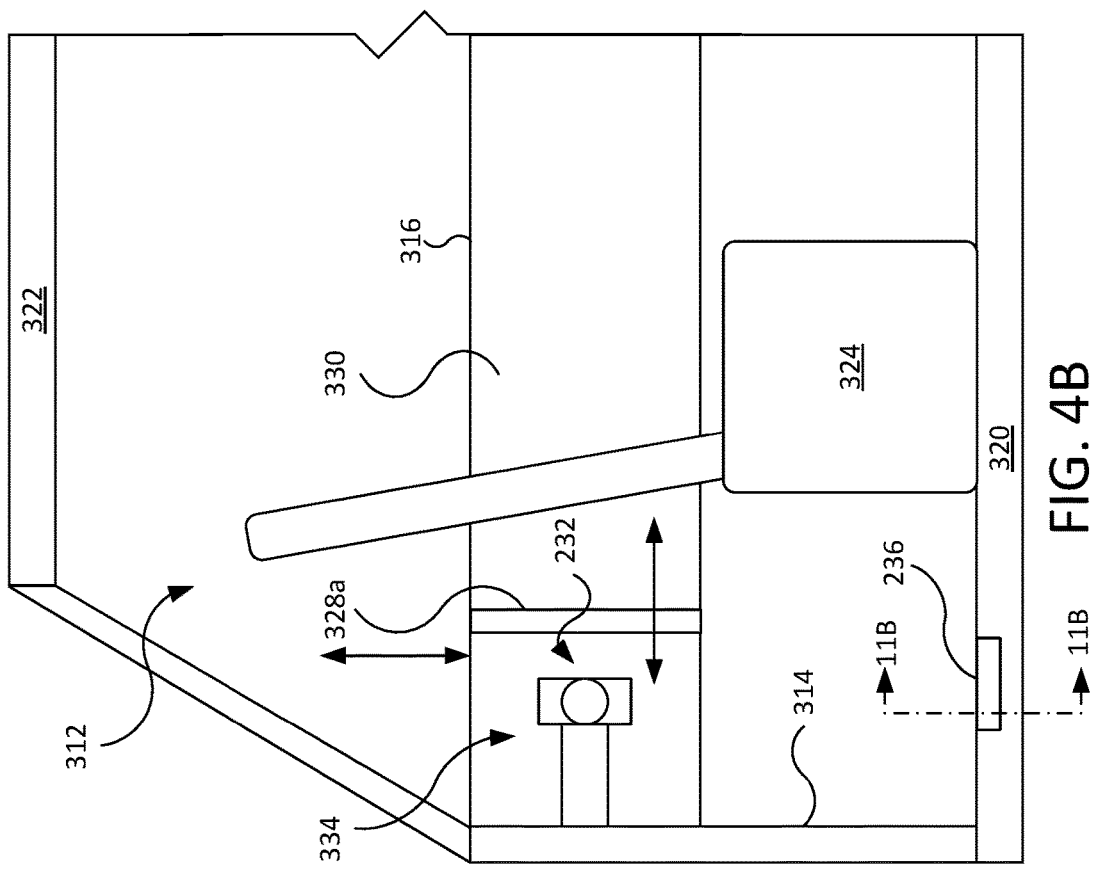
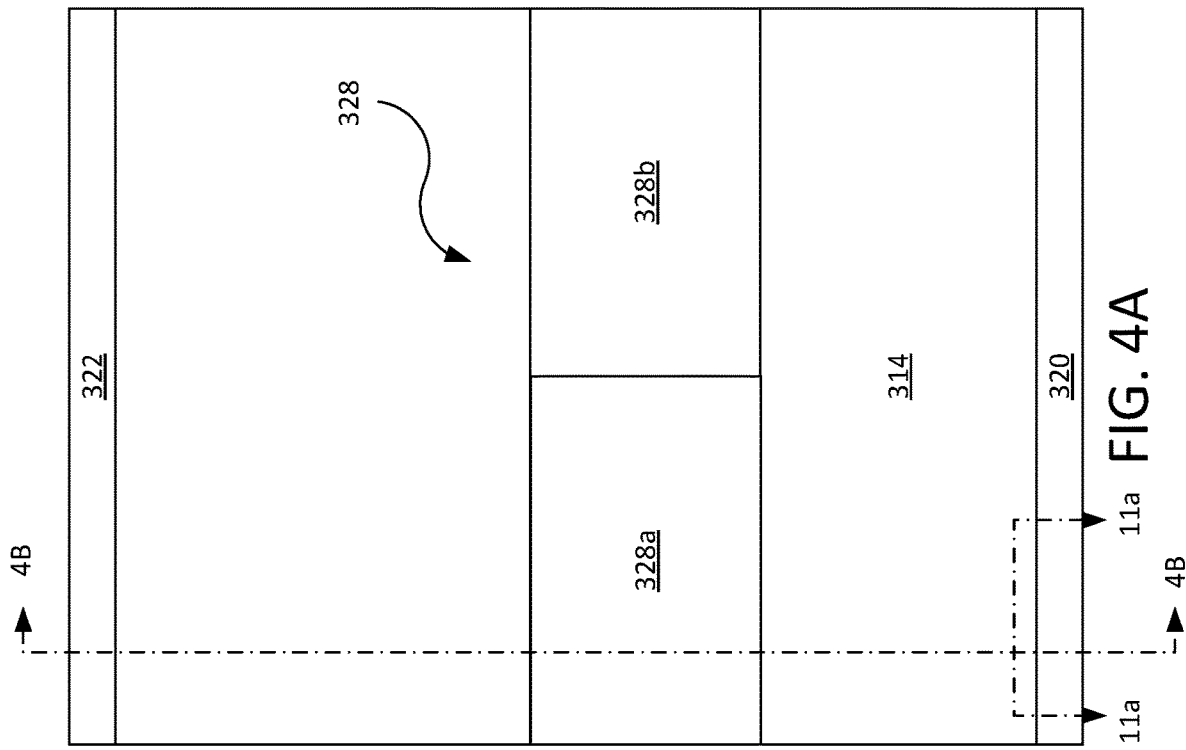

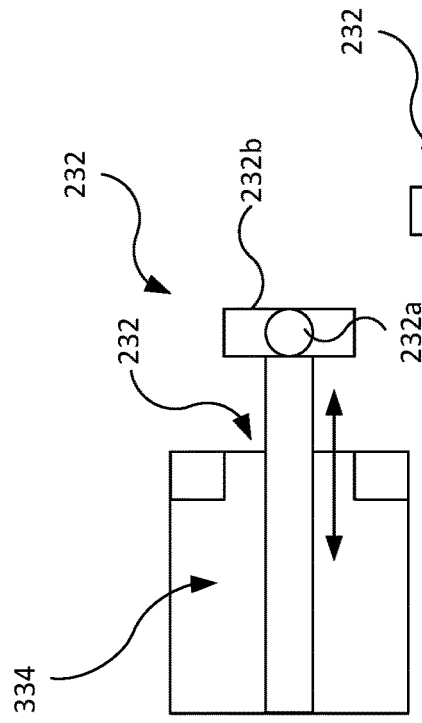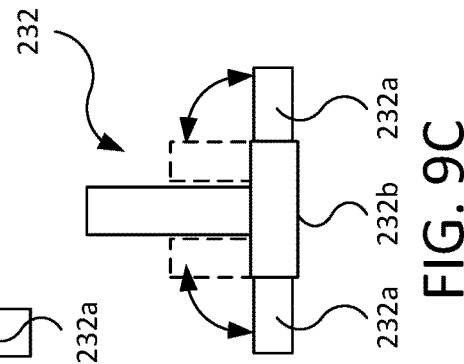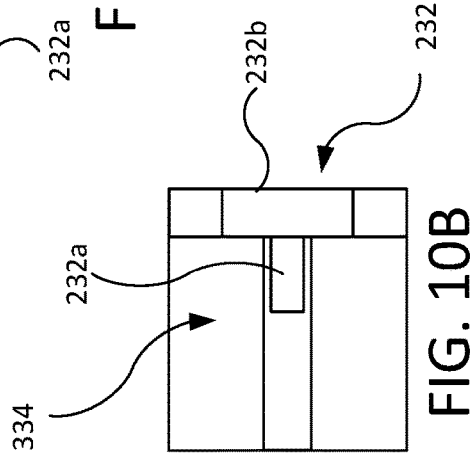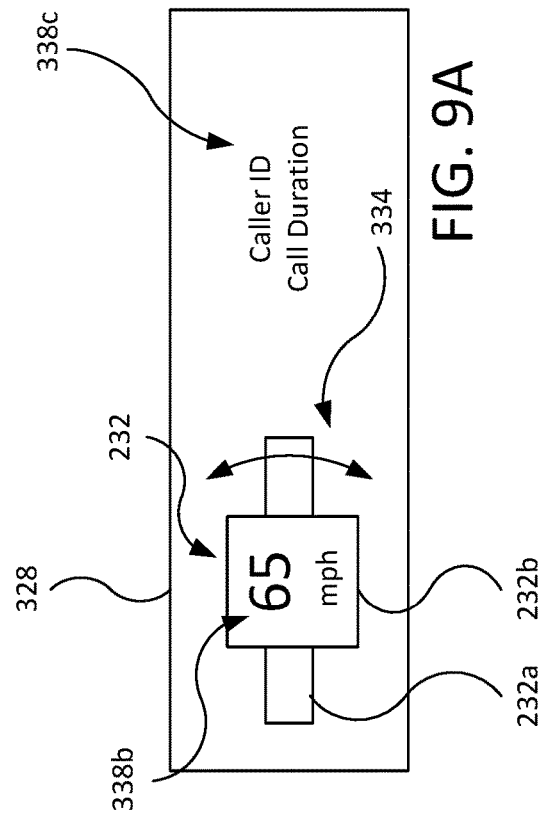

us 11,285,988 B1

PASSENGER VEHICLE AND RETRACTABLE DRIVER INPUT DEVICES THEREOF

CROSS-REFERENCE TO RELATED APPLICATION(S)

None.

TECHNICAL FIELD

This disclosure relates to passenger vehicles and, in particular, driver input devices thereof.

BACKGROUND

Traditional passenger vehicles include driver input devices for receiving driver inputs to control motion of the vehicle. Typical driver input devices include a steering wheel, an accelerator pedal, and a brake pedal for receiving the driver inputs that include steering, accelerator, and brake control inputs, respectively, from the driver. With ongoing development of autonomous driving systems, driver inputs may not be required to control motion of the vehicle in at least some circumstances, whereas driver inputs may still be required or desired in other circumstances. For example, driver input may not be required while driving on a highway with adaptive cruise control systems, whereby accelerator and braking inputs are automated to accelerate and slow the vehicle according to radar-based sensing of other vehicles, and with lane-centering systems, whereby steering inputs are automated to maintain the vehicle in a lane. Depending on the autonomous driving systems that are available on a given vehicle, driver input may still be required in other circumstances, such as in congested or less-controlled environments (e.g., in urban areas), or may otherwise be desired, such as when the driver simply prefers to manually control motion of the vehicle.

SUMMARY

Disclosed herein are implementations of passenger vehicles having driver input devices.

In an implementation, a passenger vehicle includes a vehicle body, a drive system, a steering system, a manual control system, and an autonomous control system. The vehicle body defines a passenger compartment. The drive system is coupled to the vehicle body and configured to propel the passenger vehicle. The steering system is coupled to the vehicle body and configured to steer the passenger vehicle. The manual control system includes one or more user input devices for receiving a user input from a user and is configured to control the drive system and the steering system according to the user input when the passenger vehicle is operated in a manual drive mode. The autonomous control system includes a sensor for sensing an external condition and a controller that autonomously controls the drive system and the steering system according to the external condition when the passenger vehicle is operated in an autonomous drive mode. The one or more user input devices are movable between a first configuration to receive the user input by being physically manipulated by the user, and a second configuration in which the user input is not receivable.

The passenger vehicle may include two user input devices that include a steering input device for receiving the user input of a steering input and a drive input device for receiving another user input of a drive input. The steering input device may be mechanically coupled to the vehicle body and may be rotatable by the user to receive the steering input in the first configuration. A physical separator may be arranged between the steering input device and the user in the second configuration. The drive input device may be a foot pedal that is mechanically coupled to the vehicle body and may be pressable by the user to receive the drive input in the first configuration. The foot pedal is retracted into a recess of an interior surface that defines the passenger compartment in the second configuration. The user input devices may be in the first configuration in the manual drive mode and in the second configuration in the autonomous drive mode. In the second configuration, the user input devices are configured to not be physically manipulated by the user.

In an implementation, a passenger vehicle includes a vehicle body, a seat, a steering input device, and a movable fascia component. The vehicle body defines a passenger compartment. The seat is in the passenger compartment for supporting a user. The steering input device is mechanically coupled to the vehicle body and is rotatable by the user to receive steering inputs to steer the vehicle. The movable fascia component forms a visible surface inside the passenger compartment. The steering input device and the movable fascia component are movable between a first configuration in which the movable fascia component is rearward of the steering input device and a second configuration in which the movable fascia component is forward of the steering input device.

The passenger vehicle may further include a fixed fascia component that is fixed relative to the vehicle body and forms another visible surface inside the passenger compartment. The movable fascia component may be movable relative to the fixed fascia component between the first configuration and the second configuration, and may be adjacent the fixed fascia component in the second configuration. At least one of the movable fascia component and the fixed fascia component includes an electronic display. The steering input device may be in a retracted position in the first configuration and an extended position in the second configuration. In the first configuration, the steering input device may be in the retracted position in a compartment that is selectively closed by the movable fascia component.

In an implementation, a passenger vehicle includes a vehicle body, a foot pedal, and an interior surface. The vehicle body defines a passenger compartment for a user. The foot pedal is mechanically coupled to the vehicle body and pressable by the user to receive a user input to control a speed of the passenger vehicle. The interior surface defines the passenger compartment and includes a recess. The foot pedal is movable between an extended position extending into the passenger compartment and a retracted position in the recess of the interior surface. The foot pedal being is configured to receive the user input in the extended position.

An outer periphery of the foot pedal may be complementary to an inner periphery of the recess. In the retracted position, an outer surface of the foot pedal may be substantially flush with the interior surface. The interior surface may be a floor of the passenger compartment. The foot pedal may be pivotable relative to the floor to both receive the user input and to move between the extended position and the retracted position.

BRIEF DESCRIPTION OF THE DRAWINGS

FIG. 4A is a forward-looking view from within a passenger compartment of the passenger vehicle of FIG. 1 in a second configuration.

FIG. 4B is a partial cross-sectional view of the vehicle of FIG. 1 in the second configuration taken along line 4B-4B in FIG. 4A.

FIG. 9A is a partial forward-looking view from within the passenger compartment of a sixth variation of the passenger vehicle of FIG. 1 in the first configuration.

FIG. 9B is a partial cross-sectional view of the sixth variation the passenger vehicle of FIG. 9A in the first configuration.

FIG. 9C is a partial top-down view of a steering input device of the sixth variation of the passenger vehicle of FIG. 9A in the first configuration (solid lines) and the second configuration (dashed lines).

FIG. 10A is a partial forward-looking view from within the passenger compartment of the sixth variation of the passenger vehicle of FIG. 9A in the second configuration.

FIG. 10B is a partial cross-sectional view of the sixth variation the passenger vehicle of FIG. 9A in the second configuration.

DETAILED DESCRIPTION

Disclosed herein are embodiments passenger vehicles and driver input systems and devices thereof. The driver input systems and devices disclosed herein, such as steering, acceleration, and braking input devices, are configured to be hidden from view, retracted, or otherwise blend in when not in use, such as when the passenger vehicle is under autonomous control.

Figure 1:
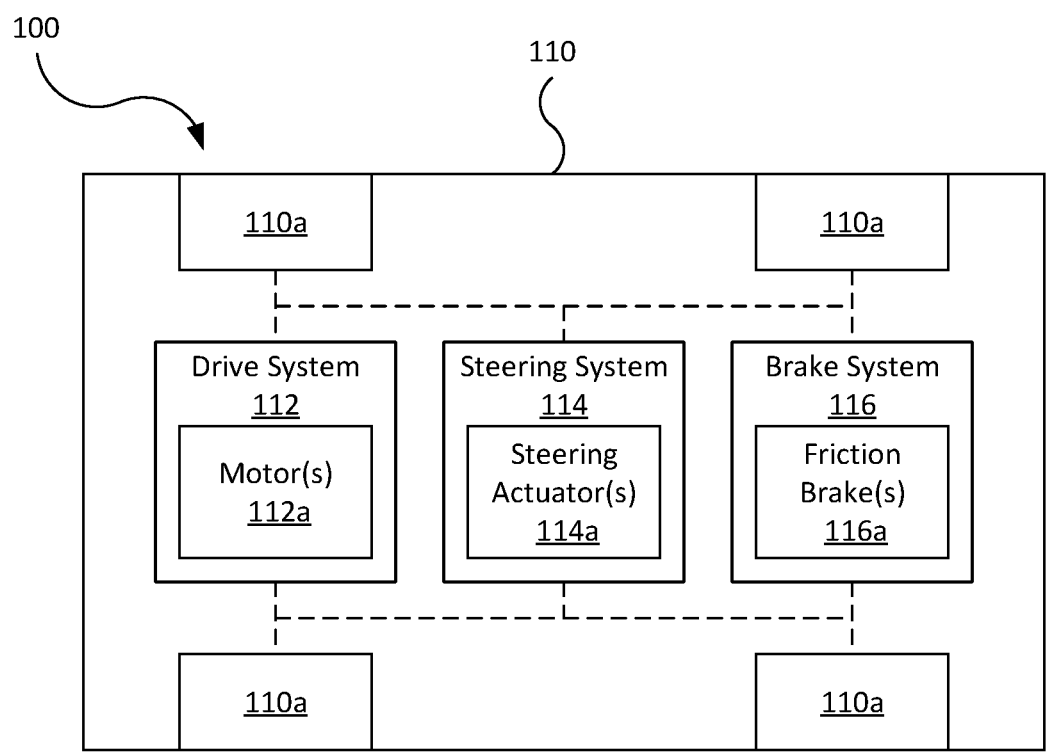
FIG. 1 is a schematic view of an embodiment of a passenger vehicle.

Referring to FIG. 1, a passenger vehicle 100 generally includes a vehicle body 110, a steering system 112, a drive system 114, and a brake system 116. The steering system 112 is coupled to the vehicle body 110 and is configured to steer the passenger vehicle 100, for example, having a steering actuator 112a that steers wheels 110a of the passenger vehicle 100. The drive system 114 is coupled to the vehicle body 110 and is configured to accelerate the passenger vehicle 100, for example, having an electric motor 114a that rotates the wheels 110a to propel the passenger vehicle 100. The brake system 116 is configured to decelerate the passenger vehicle 100, for example, having friction brakes 116a that slow rotation of the wheels 110a. The steering system 112, the drive system 114, and the brake system 116 may be referred to individually or cooperatively as vehicle output systems.

Figure 2:
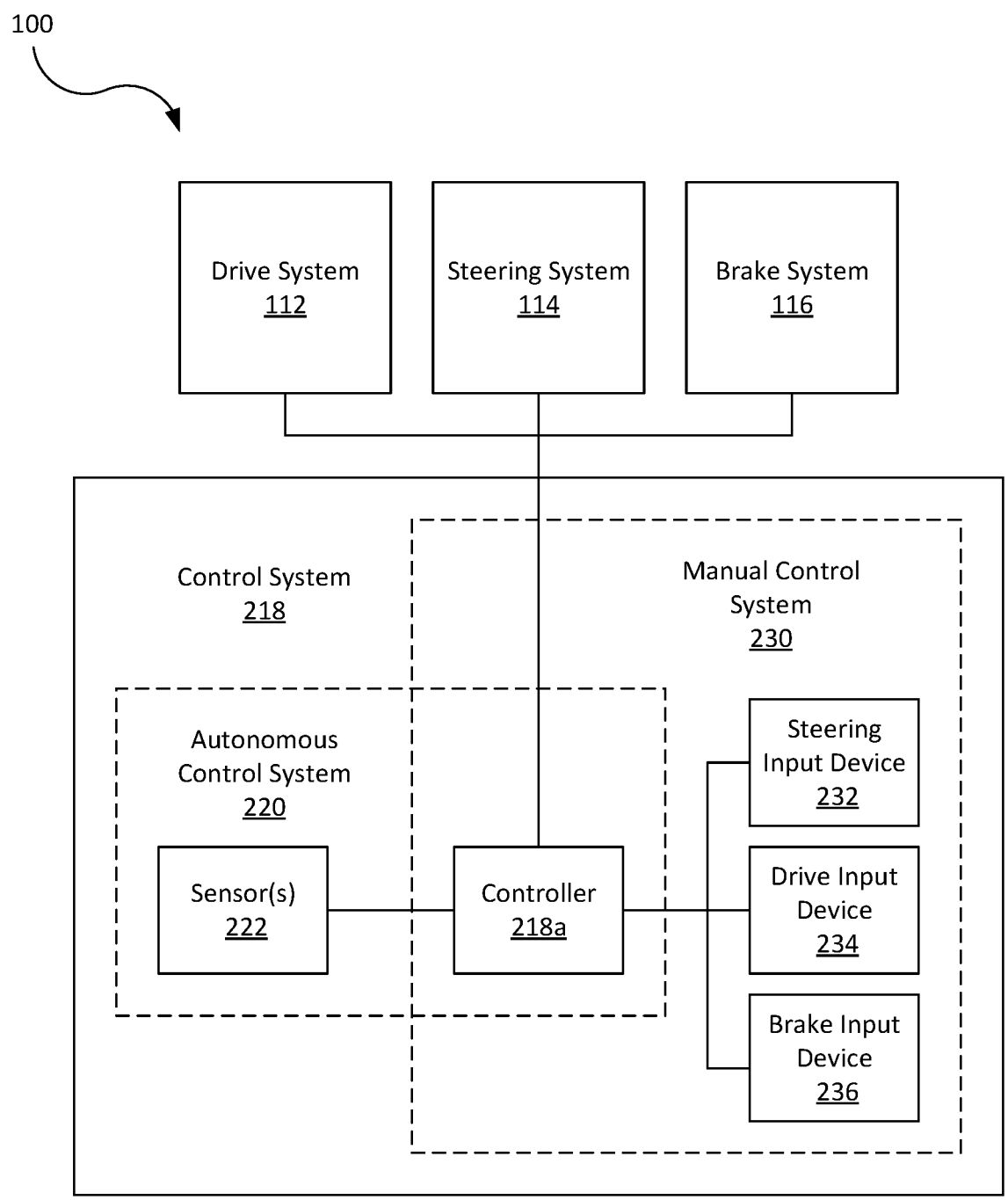
FIG. 2 is another schematic view of the passenger vehicle of FIG. 1.

Referring additionally to FIG. 2, the passenger vehicle 100 also includes a control system 218 that is configured to operate the steering system 112, the drive system 114, and the brake system 116 to control motion of the passenger vehicle 100. The control system 218 includes a controller 218a that is in communication with the steering system 112, the drive system 114, and the brake system 116. An example hardware configuration for the controller 218a is discussed below with reference to FIG. 12.

The control system 218 includes, or otherwise forms an autonomous control system 220 and a manual control system 230. The autonomous control system 220 includes a controller, such as the controller 218a, and at least one sensor 222 that senses one or more external conditions. The at least one sensor 222 includes one or more sensors suitable for sensing external conditions for navigating the vehicle, such as radar sensors, sonar sensors, LIDAR sensors, and/or cameras. The one or more external conditions may be a road condition (e.g., speed limit, traffic indicators, or location) and/or an obstacle condition (e.g., identification and location of other vehicles or obstacles), among others.

In an autonomous drive mode, the autonomous control system 220 controls the steering system 112, the drive system 114, and the brake system 116 to control motion of the passenger vehicle 100 without direct user input for controlling such vehicle output systems. For example, based on an input of a desired destination from the user, the autonomous control system 220 operates the steering system 112, the drive system 114, and the brake system 116 independent of further user input to move the passenger vehicle 100 from a current location to the destination.

The manual control system 230 includes a controller, which may also be the controller 218a, and driver input devices. The driver input devices include, for example, a steering input device 232, a drive input device 234, and a brake input device 236 that receive driver inputs for controlling the steering system 112, the drive system 114, and the brake system 116, respectively. The driver inputs are physical inputs that require physical interaction of the user (e.g., the driver) with the respective driver input device. In preferred embodiments, the driver input devices require physical interaction in manners familiar to conventional driver input devices, such as rotation with the user's hands for steering inputs (e.g., similar to a steering wheel), pressing with the user's foot for drive inputs (e.g., similar to a throttle pedal), and pressing with the user's foot for brake inputs (e.g., similar to a brake pedal). The driver inputs may be referred to as a driver steering input, a driver drive input, and a driver brake input as may be appropriate. The driver input devices may also be referred to as user input devices, the driver inputs as user inputs, and the driver as a user. Preferred embodiments of the steering input device 232, the drive input device 234, and the brake input device 236 are discussed in further detail below.

In a manual drive mode, the manual control system 230 controls the steering system 112, the drive system 114, and the brake system 116 to control motion of the passenger vehicle 100 based on driver inputs to the steering input device 232, the drive input device 234, and the brake input device 236. For example, the controller 218a may interpret input signals from the respective driver input devices (e.g., measuring physical manipulation thereof), and output control signals to the corresponding vehicle output system.

As discussed in further detail below, the physical configuration, as well as the aesthetics, of the manual control system 230 are designed to provide an experience in the autonomous drive mode whereby motion control of the passenger vehicle 100 is generally unapparent to the passengers, including any potential user (e.g., driver or operator). Specifically, the driver input devices are configured to be hidden or visually disguised with other aesthetic or functional components inside the passenger vehicle 100. As a result, the passengers may have a richer transportation experience, being undistracted by concerns of operating the passenger vehicle 100 and more engaged with other activities, such as consuming entertainment content or conversing with other passengers.

Figure 3B:
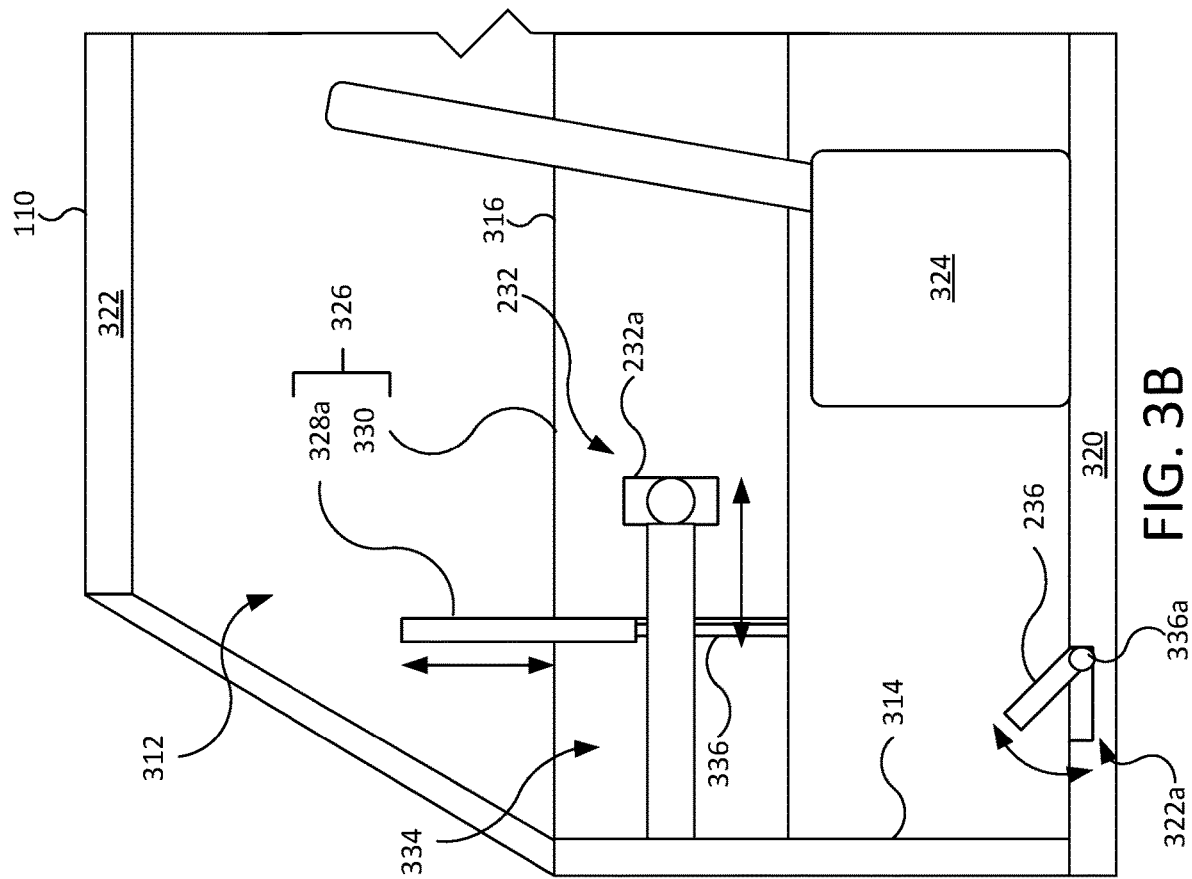
FIG. 3B is a partial cross-sectional view of the vehicle of FIG. 1 in the first configuration taken along line 3B-3B in FIG. 3A.
Figure 3A:
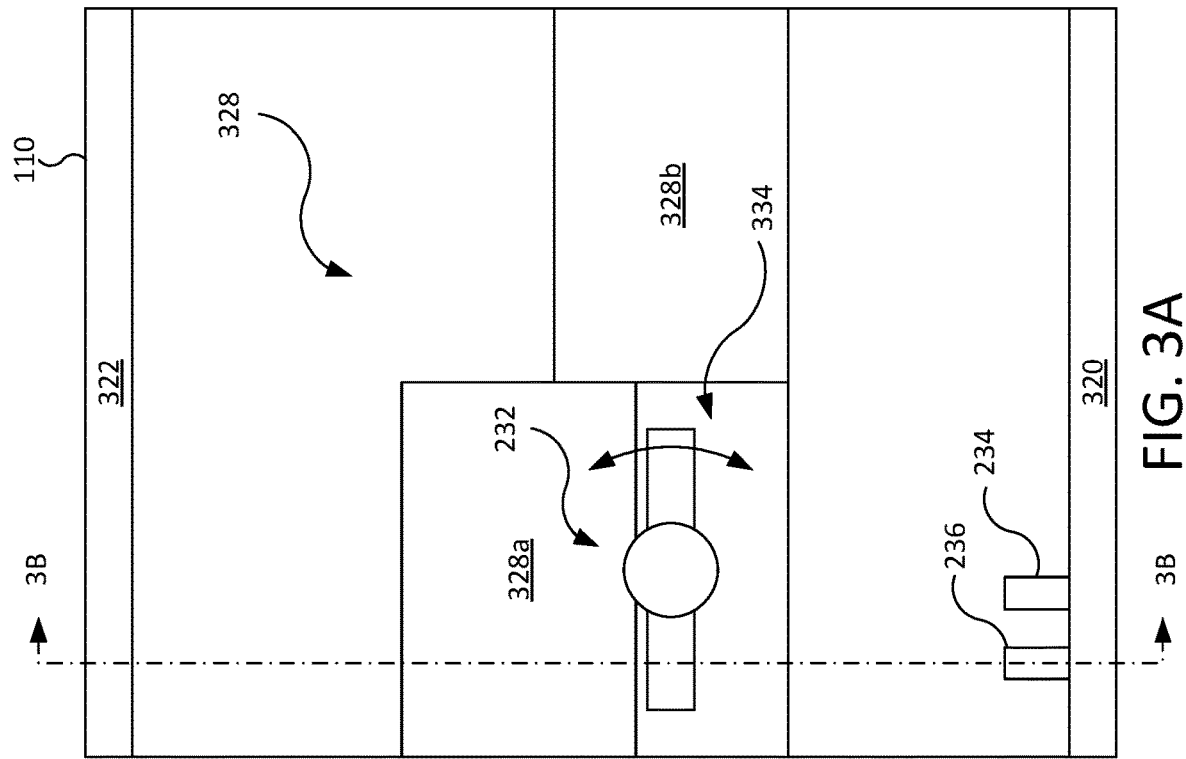
FIG. 3A is a forward-looking view from within a passenger compartment of the passenger vehicle of FIG. 1 in a first configuration.

With further reference to FIGS. 3A-3B, the vehicle body 110 defines a passenger compartment 312. For example, the vehicle body 110 includes a forward body structure 314, side body structures 316 (e.g., including movable doors), a rearward body structure (not shown), a floor structure 320, and a roof structure 322, which define the passenger compartment 312 therebetween (e.g., between interior surfaces thereof). One or more seats 324 are positioned in the passenger compartment 312 to support a user (e.g., a passenger) thereon. The seats 324 may be reconfigurable, so as to move to different positions (e.g., forward, rearward, inboard, outboard) and/or different orientations (e.g., to face forward or rearward; compare FIGS. 3B and 4B). As used herein terms, such as "forward" generally correspond to the forward direction of travel of the passenger vehicle 100.

The passenger vehicle 100 also includes an interior fascia 326 that forms a visible surface in the interior of the passenger compartment 312 (e.g., a decorative surface and, in part, defining a volume of the passenger compartment 312 for the passengers). The interior fascia 326, for example, includes a front fascia 328 in a front region of the passenger compartment 312, and may also include a side fascia 330 (e.g., extending over doors and/or any side structures) and/or a rear fascia (not shown). Adjacent portions of the interior fascia 326, such as the front fascia 328 and the side fascia 330, may be configured to form a desired aesthetic, such as by continuing lines or surfaces (e.g., curvature) and materials (e.g., plastic, wood, leather), as well as colors and textures thereof. In some embodiments, the interior fascia 326 may include one or more electronic displays, as discussed in further detail below. By forming the visible surfaces in the interior of the passenger compartment 312, the interior fascia 326 may cover underlying structures (e.g., portions of the forward body structure 314, the side body structures 316, and/or the rear body structure) and/or underlying devices (e.g., motors for operating retractable windows, drivers for audio speakers, sensors, and/or airbags).

Still referring to FIGS. 3A-3B and additionally to FIGS. 4A-4B, the driver input devices are reconfigurable, for example, according to whether the passenger vehicle 100 is being operated in a manual drive mode or an autonomous drive mode. In one configuration shown in FIGS. 3A-3B (e.g., manual control or in-use configuration), the driver input devices are at inward positions relative to the passenger compartment 312 and otherwise configured to be physically interfaced with (e.g., physically engaged or physically manipulated) by the user to receive the driver inputs. In another configuration shown in FIGS. 4A-4B, the driver input devices are at outward positions relative the passenger compartment 312. In the outward positions, the driver input devices are configured to not be physically interfaced with by the user, to otherwise not receive driver inputs, and/or to be hidden or visually disguised.

In one example, the steering input device 232 is a steering bar having opposing grips 232a (e.g., on left and right sides) that may be grasped or otherwise physically engaged by hands of the user. The steering input device 232 is mechanically coupled to the vehicle body 110 (directly or indirectly, such as to the forward body structure 314), and is configured to be rotated relative thereto by the user to receive the driver steering input. In the manual control configuration (see FIGS. 3A-3B), the steering input device 232 is in an extended position (e.g., the inward position) generally between a forward portion of the passenger vehicle 100, such as the front fascia 328, and the user (e.g., the seat 324 on which the user may be seated). Thereby, the user may grasp and rotate the steering input device 232 to provide driver steering input. The steering input device 232 may instead be configured as a steering wheel.

In the autonomous control configuration (see FIGS. 4A-4B), the steering input device 232 is in a retracted position, which is generally forward of the extended position. For example, the steering input device 232 may be positioned in a compartment 334 in the retracted position. In contrast, the steering input device 232 is outside of the compartment 334 (e.g., rearward thereof) in the extended position.

Instead or additionally (as shown), the steering input device 232 may be arranged behind a portion of the interior fascia 326, such as a portion of the front fascia 328. For example, the front fascia 328 includes a movable fascia component 328a (compare FIGS. 3A-3B to FIGS. 4A-4B). The front fascia 328 (e.g., the movable fascia component 328a) functions as a physical separator that is located between the steering input device 232 and the user when the steering input device 232 is in the retracted position, which prevents or hinders physical access by the user to the steering input device 232.

The front fascia 328 is forward of the steering input device 232 when in the extended position. For example, the movable fascia component 328a is movable relative to the compartment 334 between an open position (FIGS. 3A-3B) and a closed position (FIGS. 4A-4B) to selectively close the compartment 334. In the closed position, the movable fascia component 328a closes the compartment 334 with the steering input device 232 stowed therein in the retracted position. In the open position, the movable fascia component 328a opens the compartment 334 to allow the steering input device 232 to move to the extended position.

As illustrated in FIGS. 3A-3B, the movable fascia component 328a moves upward (e.g., upward translation) from the closed position to the open position with a movement mechanism. As shown in FIG. 3A, the movement mechanism includes a linear actuator 336 (e.g., a lead screw mechanism rotated by an electric motor), which cause the movable fascia component 328a to translate up and down between the open and closed positions.

Figure 5:
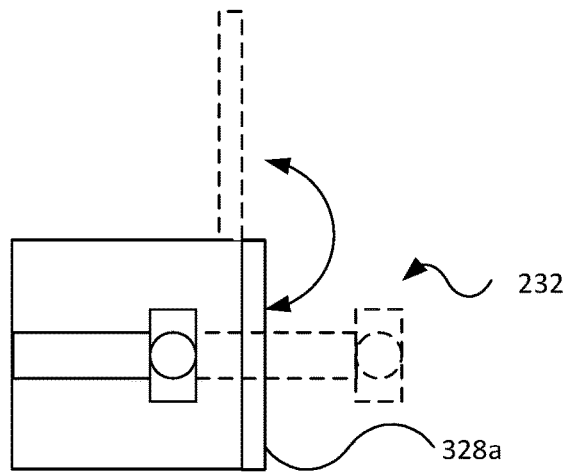
FIG. 5 is a partial cross-sectional view of a second variation the passenger vehicle of FIG. 1 in the first configuration (dashed lines) and the second condition (solid lines).
Figure 6:
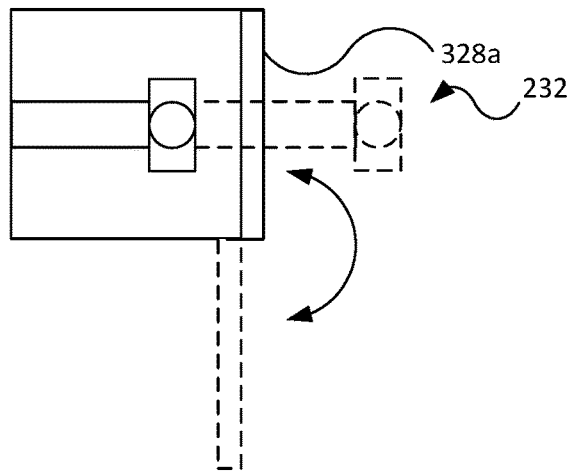
FIG. 6 is a partial cross-sectional view of a third variation the passenger vehicle of FIG. 1 in the first configuration (dashed lines) and the second configuration (solid lines).
Figure 7:
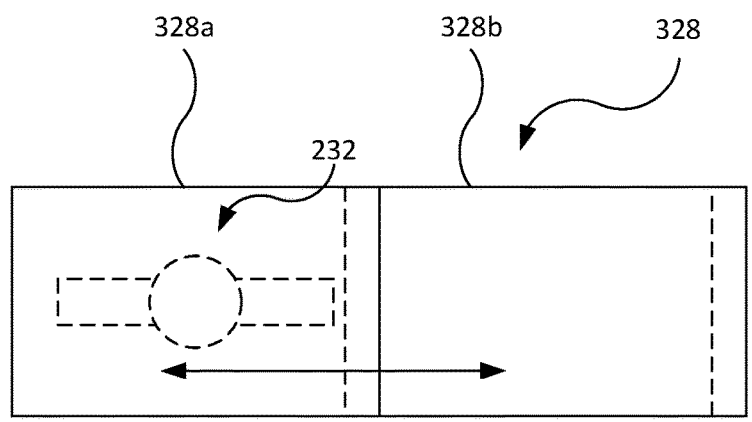
FIG. 7 is a partial forward-looking view from within the passenger compartment of a fourth variation of the passenger vehicle of FIG. 1 in the first configuration (dashed lines) and the second configuration (solid lines).

Referring to FIGS. 5-7, the movable fascia component 328a may move between the closed position and the open position in other manners. In FIGS. 5-7, dashed lines depict the steering input device 232 and the movable fascia component in the extended position and the open position, respectively. As shown in FIG. 5, the movable fascia component 328a is pivotable about an upper hinge (e.g., by an electric motor). As shown in FIG. 6, the movable fascia component 328a is pivotable about a lower hinge (e.g., by an electric motor). As shown in FIG. 7, the movable fascia component moves by sideways translation (e.g., left and right), such as with a linear actuator (e.g., a lead screw).

The movable fascia component 328a may be configured to provide a cohesive aesthetic with other interior portions of the passenger compartment 312, such as another fascia component 328b of the front fascia 328 that is adjacent thereto (e.g., in the first configuration or the closed position). The other fascia component 328b may be fixed relative to the vehicle body 110, such that the movable fascia component 328a is movable relative thereto, and may be referred to as a fixed fascia component 328b. In one example, the interior surface of the fascia components 328a, 328b may be the same (e.g., wood, plastic, metal, or combinations thereof).

Figure 8A:
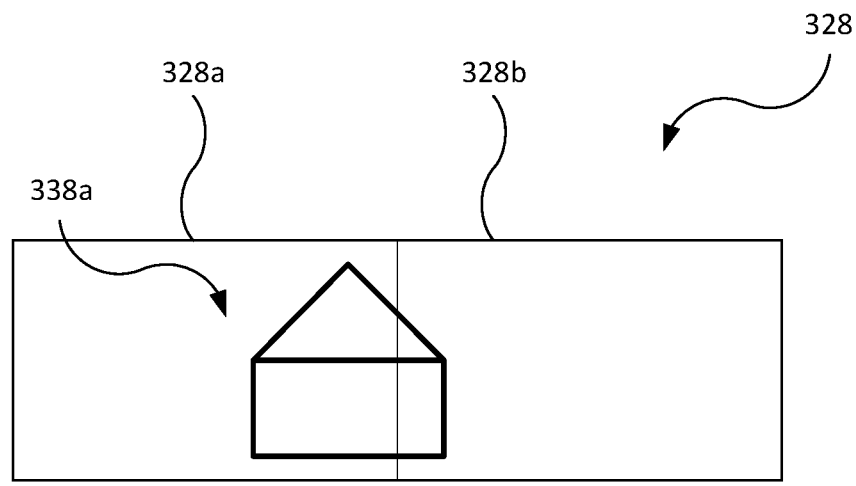
FIG. 8A is a partial forward-looking view of a fifth variation of the passenger compartment in the second configuration displaying graphical content.
Figure 8B:
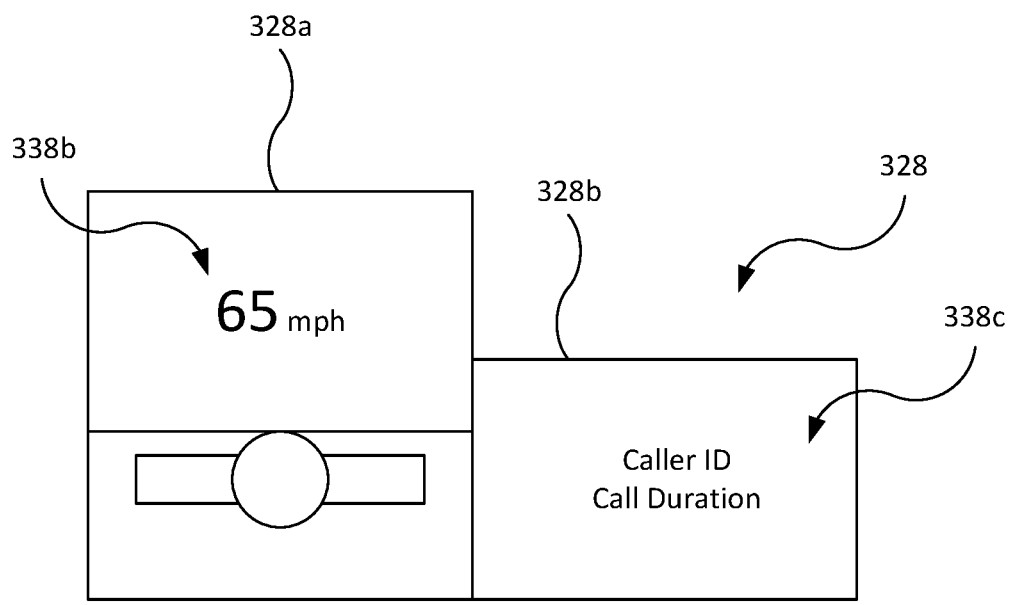
FIG. 8B is a partial forward-looking view of the fifth variation of the passenger compartment in the first configuration displaying different graphical content from FIG. 8A.

Referring to FIGS. 8A-8B, in another example, the movable fascia component 328a includes an electronic display and the other fascia component 328b includes another electronic display, which may be configured to display graphical content of different types and in different manners. The graphical content may, for example, include entertainment content (e.g., pictures and/or videos), information content (e.g., weather, communications information), or driving content pertaining to conditions of the driving systems of the vehicle (e.g., current speed, navigation information, vehicle status information, such as battery charge).

The graphical content may be varied, for example, according to the drive mode. For example, in the autonomous drive mode, entertainment content may be displayed on both the electronic display of the movable fascia component 328a and the other fascia component 328b adjacent thereto. As illustrated in FIG. 8A, a continuous graphic 338a, such as an image (e.g., a static image or frames of a video) may be displayed cooperatively by the electronic displays of the fascia components 328a, 328b with different portions of the image being displayed thereon (e.g., a house as shown for illustrative purposes). In another exampled illustrated in FIG. 8B, in the manual drive mode, the electronic display of the movable fascia component 328a may display driving information 338b (e.g., speed) to function as an instrument panel of the passenger vehicle 100, while the electronic display of the other fascia component 328b may display other graphical content (e.g., information content 338c, such as communication information).

Referring to FIGS. 9A-10B, the steering input device 232 includes a display screen 232b that moves with the steering input device 232 between the extended position and the retracted position. In the extended position (e.g., in the manual drive configuration), the display screen 232b may, for example, display driving information 338b. The front fascia 328 may also be a display screen that may, for example, display information content 338c.

In the retracted position (e.g., in the autonomous driver configuration), the display screen 232b is recessed partially into the compartment 334, such that a surface of the display screen 232b may be generally flush with an inner surface of the front fascia 328, which may itself include a display screen. The front fascia 328 thus, includes a cutout 334a (e.g., an aperture) for receiving the display screen 232b therein (e.g., having complementary inner and outer peripheries). As such, the display screen 232b of the steering input device 232 and the display screen of the front fascia 328 may display the continuous graphic 338a cooperatively thereon. The opposing grips 232a (e.g., handles) may be pivoted rearward of the display screen 232b to travel through the cutout 334a and into the compartment 334 (see e.g., FIG. 9C).

Figure 11A:
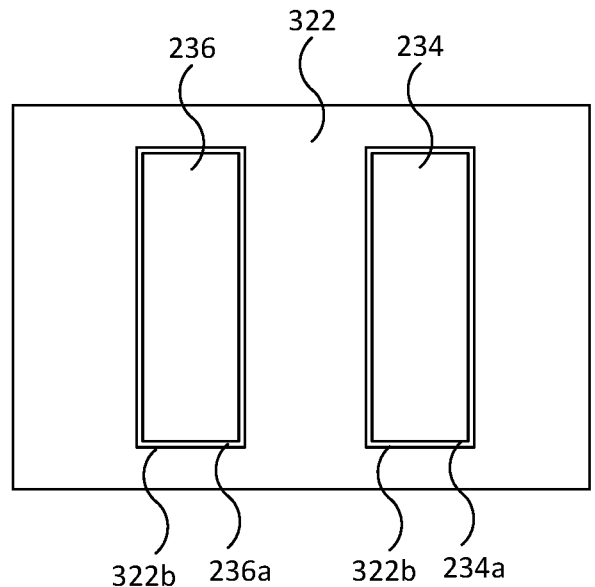
FIG. 11A is a partial cross-sectional view taken along line 11A-11A in FIG. 4A.
Figure 11B:
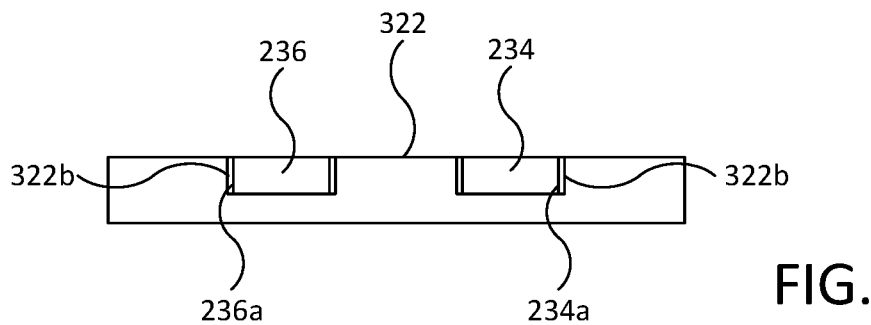
FIG. 11B is a partial cross-sectional view taken along line 11B-11B in FIG. 4B.

Referring again to FIGS. 3A-4B and additionally to FIGS. 11A-11B, the drive input device 234 and the brake input device 236 are also reconfigurable, for example, according to whether the passenger vehicle 100 is being operated in the manual drive mode or in the autonomous drive mode. The drive input device 234 and the brake input device 236 are each configured as foot pedals that maybe pressed or otherwise physically engaged by feet of the user. The drive input device 234 and the brake input device 236 are mechanically coupled to the vehicle body 110 (e.g., directly or indirectly), such as to the floor structure 320 (as shown), and are configured to be pressed (e.g., rotated) relative thereto by the user to receive the driver drive input and the driver brake input, respectively. In the manual control configuration (see FIGS. 3A-3B), the drive input device 234 and the brake input device 236 are in extended or upward positions (e.g., inward positions relative to the passenger compartment 312). Alternatively, the drive input device 234 and the brake input device 236 may be mechanically coupled to another portion of the vehicle body 110, such as the forward body structure 314 that also defines a portion of the interior surface defining the passenger compartment 312.

In the autonomous control configuration (see FIGS. 4A-4B), the drive input device 234 and the brake input device 236 are in retracted positions (e.g., outward positions relative to the passenger compartment 312). For example, the drive input device 234 and the brake input device 236 may each be positioned in recesses 320a in the interior surface formed by the floor structure 320 (as shown).

While in the retracted position, the drive input device 234 and the brake input device 236 are configured to not receive user inputs. For example, the drive input device 234 and the brake input device 236 may not be physically movable to receive user input (e.g., resting against a stop or bottom of the recess 322a). The recesses 322a and the foot pedals of the drive input device 234 and of the brake input device 236 have complementary shapes, for example, the recesses 322a each have an inner periphery 322b that is complementary in shape and size (e.g., matches) an outer periphery 234a of the drive input device 234 or an outer periphery 236a of the brake input device 236 (see FIG. 11A). Furthermore, the upper surfaces of the foot pedals (e.g., an outer surface or an upper surface thereof) are substantially flush with the inner surface of the floor structure 320. Because of having complementary peripheries, common materials, and being flush, the foot pedals of the drive input device 234 and the brake input device 236 may blend in with the floor structure 320, for example, being noticeable visually only by a parting line between the outer and inner peripheries thereof.

To move between the retracted position and the extended position, the drive input device 234 and the brake input device 236 (i.e., the foot pedals) are pivoted rearward, for example, with one or more electric motors 336a. As shown, the drive input device 234 and the brake input device 236 pivot about an axis proximate a rear upper edge of the recess 322a, but may pivot about any suitable axis (e.g., rearward of and below the rear upper edge of the recess 322a) or be moved in any other suitable manner (e.g., combinations of translation and pivoting.

Figure 12:
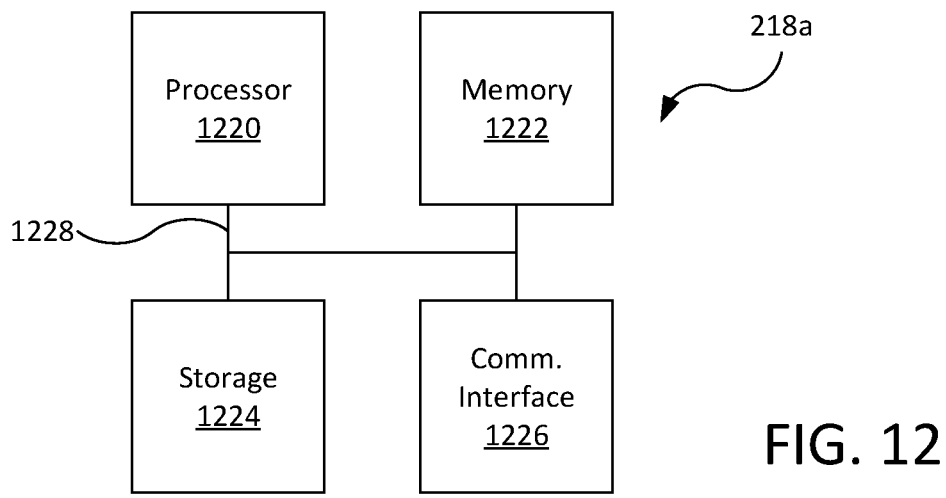
FIG. 12 is a schematic view of an example hardware configuration of a controller of a control system of the passenger vehicle.

Referring to FIG. 12, the controller 218a is a computing device used to implement the systems, devices, and methods disclosed herein. In one example configuration, the controller 218*a* generally includes a processor 1220, a memory 1222, a storage 1224, communications interface 1226, and a bus 1228 whereby the other components are in communication with each other. The processor 1220 may be any suitable processing device, such as a central processing unit (CPU) configured to execute code and instructions. The memory 1222 is a short-term, volatile memory such as random access memory (RAM). The storage 1224 is a long term storage device, such as a hard disc drive (HDD) or solid state drive (SSD), which stores the code according to which instructions are executed by the processor 1220. The communications interface 1226 sends and receives signals from the controller 218*a*, for example, receiving driver input signals from the driver input devices and sending output control signals to the vehicle output systems.

What is claimed is:

1. A passenger vehicle comprising:
   a vehicle body defining a passenger compartment;
   a drive system coupled to the vehicle body and configured to propel the passenger vehicle;
   a steering system coupled to the vehicle body and configured to steer the passenger vehicle;
   a manual control system having one or more user input devices for receiving one or more user inputs from a user and being configured to control the drive system and the steering system according to the user inputs when the passenger vehicle is operated in a manual drive mode; and
   an autonomous control system having a sensor for sensing an external condition and a controller that autonomously controls the drive system and the steering system according to the external condition when the passenger vehicle is operated in an autonomous drive mode; and
   a movable fascia component having a first electronic display and a fixed fascia component having a second electronic display;
   wherein the one or more user input devices are movable between a first configuration to receive the user inputs by being physically manipulated by the user, and a second configuration in which the user inputs are not receivable;
   wherein the movable fascia component is movable relative to the fixed fascia component and in the second configuration is located between the user and at least one of the one or more user input devices; and
   wherein in the second configuration, the electronic display and the other electronic display are configured to cooperatively display a continuous graphic with different portions of an image being displayed thereon.

2. The passenger vehicle according to claim 1, comprising two of the user input devices that include a steering input device for receiving the user input of a steering input, and a drive input device for receiving another user input of a drive input;
   wherein the steering input device is mechanically coupled to the vehicle body, is rotatable by the user to receive the steering input in the first configuration, and a physical separator is arranged between the steering input device and the user in the second configuration;
   wherein the drive input device is a foot pedal that is mechanically coupled to the vehicle body, is pressable by the user to receive the drive input in the first configuration, and is retracted into a recess of an interior surface defining the passenger compartment in the second configuration;
   wherein the one or more user input devices are in the first configuration in the manual drive mode and in the second configuration in the autonomous drive mode; and
   wherein in the second configuration, the user input devices are configured to not be physically manipulated by the user.

3. The passenger vehicle according to claim 1, wherein in the second configuration, the one or more user input devices are configured to not be physically manipulated by the user.

4. The passenger vehicle according to claim 3, wherein the one or more user input devices are in the first configuration in the manual drive mode and in the second configuration in the autonomous drive mode.

5. The passenger vehicle according to claim 1, wherein the one or more user input devices includes a steering input device, and the user input is a steering input.

6. The passenger vehicle according to claim 5, wherein the steering input device is mechanically coupled to the vehicle body and, in the first configuration, is rotatable by the user to receive the steering input.

7. The passenger vehicle according to claim 6, wherein the movable fascia component forms a physical separator that is arranged between the steering input device and the user, and in the second configuration, the steering input device is physically inaccessible from the passenger compartment.

8. The passenger vehicle according to claim 5, wherein the steering input device includes the electronic display.

9. The passenger vehicle according to claim 8, wherein the electronic display moves with the steering input device between the first configuration and the second configuration, the first configuration being an extended position and the second configuration being a retracted position of the steering input device.

10. The passenger vehicle according to claim 1, wherein the one or more user input devices includes a drive input device, and the user input is a drive input.

11. The passenger vehicle according to claim 10, wherein the drive input device is a foot pedal that is mechanically coupled to the vehicle body and, in the first configuration, is pressable by the user to receive the drive input.

12. The passenger vehicle according to claim 11, wherein in the second configuration, the foot pedal is retracted into a recess of an interior surface defining the passenger compartment.

13. The passenger vehicle according to claim 1, wherein in the second configuration, the electronic display is flush with the fixed fascia component.

14. A passenger vehicle comprising:
    a vehicle body defining a passenger compartment;
    a seat in the passenger compartment for supporting a user;
    a steering input device that is mechanically coupled to the vehicle body and rotatable by the user to receive steering inputs to steer the vehicle; and
    a movable fascia component that forms a visible surface inside the passenger compartment;
    wherein the steering input device and the movable fascia component are movable between a first configuration in which the movable fascia component is rearward of the steering input device and a second configuration in which the movable fascia component is forward of the steering input device relative to a forward direction of travel of the passenger vehicle; and wherein the movable fascia component includes an electronic display, and forms a physical separator that in the first configuration is arranged between the steering input device and the user.

15. The passenger vehicle according to claim 14, further comprising a fixed fascia component that is fixed relative to the vehicle body and that forms another visible surface inside the passenger compartment;
   wherein the movable fascia component is movable relative to the fixed fascia component between the first configuration and the second configuration, the movable fascia component and the fixed fascia component being adjacent in the second configuration;
   wherein the fixed fascia component includes another electronic display, and in the first configuration, the electronic display and the other electronic display are configured to cooperatively display a continuous graphic with different portions of an image being displayed thereon;
   wherein the steering input device is in a retracted position in the first configuration and an extended position in the second configuration; and
   wherein in the first configuration, the steering input device is in the retracted position in a compartment that is selectively closed by the movable fascia component.

16. The passenger vehicle according to claim 14, further comprising a fixed fascia component that is fixed relative to the vehicle body and that forms another visible surface inside the passenger compartment, wherein the movable fascia component is movable relative to the fixed fascia component between the first configuration and the second configuration, the movable fascia component and the fixed fascia component being adjacent in the second configuration.

17. The passenger vehicle according to claim 16, wherein the movable fascia component is movable relative to the fixed fascia component by at least one of upward translation, sideways translation, or upward pivoting.

18. The passenger vehicle according to claim 16, wherein the fixed fascia component includes another electronic display.

19. The passenger vehicle according to claim 18, wherein in the first configuration, the electronic display and the other electronic display are configured to cooperatively display a continuous graphic with different portions of an image being displayed thereon.

20. The passenger vehicle according to claim 16, wherein in the first configuration, the movable fascia component is flush with the fixed fascia component.

21. The passenger vehicle according to claim 14, wherein the steering input device is in a retracted position in the first configuration and an extended position in the second configuration.

22. The passenger vehicle according to claim 21, wherein in the first configuration, the steering input device is in the retracted position in a compartment that is selectively closed by the movable fascia component.

23. A passenger vehicle comprising:
   a vehicle body defining a passenger compartment for a user;
   a foot pedal that is mechanically coupled to the vehicle body and pressable by the user to receive a user input to control a speed of the passenger vehicle; and
   an interior surface defining the passenger compartment and having a recess including a bottom surface;
   wherein the foot pedal is movable between an extended position extending into the passenger compartment and a retracted position in the recess of the interior surface, the foot pedal being configured to receive the user input in the extended position; and
   wherein in the retracted position, an outer surface of the foot pedal is substantially flush with the interior surface and the bottom surface of the recess acts as a stop.

24. The passenger vehicle according to claim 23, wherein an outer periphery of the foot pedal is complementary to an inner periphery of the recess;
   wherein in the retracted position, an outer surface of the foot pedal is substantially flush with the interior surface;
   wherein the interior surface is a floor of the passenger compartment; and
   wherein the foot pedal is pivotable relative to the floor to both receive the user input and to move between the extended position and the retracted position.

25. The passenger vehicle according to claim 23, wherein an outer periphery of the foot pedal is complementary to an inner periphery of the recess.

26. The passenger vehicle according to claim 23, wherein the interior surface is a floor of the passenger compartment.

27. The passenger vehicle according to claim 26, wherein the foot pedal is pivotable relative to the floor to both receive the user input and to move between the extended position and the retracted position.

28. The passenger vehicle according to claim 23, wherein the foot pedal has an outer periphery and the recess of the interior surface has an inner periphery that is complementary to the outer periphery of the foot pedal.

29. The passenger vehicle according to claim 23, wherein the outer surface of the foot pedal and the interior surface have common materials.

* * * * *